UNITED STATES PATENT OFFICE.

GEORGE B. PENNOCK, OF BROOKLYN, NEW YORK.

ELECTROLYTE COMPOUND.

SPECIFICATION forming part of Letters Patent No. 377,210, dated January 31, 1888.

Application filed January 12, 1887. Serial No. 224,121. (No specimens.)

*To all whom it may concern:*

Be it known that I, GEORGE B. PENNOCK, a citizen of the United States, residing at Brooklyn, in the county of Kings and State of New York, have invented certain new and useful Improvements in Electrolyte Matter for Galvanic Batteries, whereby the electro-motive power and constancy of each cell or jar are increased and loss of bulk by evaporation is prevented; and I do hereby declare that the following is a full, clear, and exact description of the process.

Electric-battery solutions containing bichromate of soda and potash, now in use, generally fail before the chromic acid, which is really the active agent, can be set free, and the bottom of the cells and the surface of the electrodes become furred with a crystallized mass, which destroys the action of such batteries; and while in my new compound for electric batteries this cannot occur, as explained below, I nevertheless prefer to use the pure chromic acid, as it is readily soluble, and, being entirely a free acid, its working capacity is made at once available, so that it is a most desirable material as an important element in electric batteries. In powdered form it is easily handled, and if used in galvanic batteries, with the necessary sulphuric acid present, without my improvement it will remain in the cells for months without crystallizing.

My new depolarizing compound for the outside jar of an electric battery, which I will designate as "No. 1," consists of the following ingredients, combined in the proportions stated, viz: water, thirty-two pounds; chromic acid, twelve pounds; sulphuric acid, sixteen pounds; mineral wool, one pound.

My new compound for the inside jar or porous cup, which I will call "No. 2," is composed as follows: water, nine pounds; mineral wool, eight ounces.

To carry my invention into effect I first dissolve the chromic acid in water. I then add the sulphuric acid, the solution during this time being thoroughly stirred. The fluid is then allowed to grow cold. The mineral wool, preferably refined, is now added gradually; but during these additions the solution must be constantly agitated. The mixture now reaches its maximum heat. As it again grows cool it is changed into a jellied mass.

I prefer to mix the component parts of this new electrolyte compound in the vessel intended for service, and this vessel can be of any good acid-proof material, but preferably of a large size. The inside jar or porous cup can be of any suitable porous material, and made to contain at least one and a half gallon of the compound No. 2. This latter compound is formed by simply pouring the water on the wool and stirring it thoroughly.

The electrodes to be used with my compounds can be manufactured from the best-known materials; but I prefer to use large plates of zinc and carbon. The jellied compound being now ready in the outside jar, the porous cup, with its contents, and the carbon electrodes are pressed firmly into the mass.

I am aware that chromic acid and sulphuric acid have been used, in combination with water, in galvanic batteries; and while these acid solutions are of the strongest used in primary batteries for feeding electric currents to illuminate incandescent lamps and to run electric motors, and although these electrolytes show high electro-motive force when used in cells of the standard size, I have made a valuable discovery that by the addition of mineral wool, preferably the refined, the electro-motive force of each cell is greatly increased and the mixture of acids in an aqueous solution, hereinbefore mentioned, is turned into a non-evaporable jelly of low resistance. This increase of power is caused by the sulphide of calcium contained in the mineral wool being readily dissolved by the strong acids liberating hydrosulphuric acids, and although this is a weak acid when liberated from the mineral wool by water, in combination with strong bases forms an extremely-powerful depolarizing compound. The mineral wool, however, must be added in very small quantities, as during the process of mixture a very offensive odor is emitted, which is that of hydrosulphuric acid.

The jelly, which I have caused to be called "electric-current" jelly, is formed by the gradual addition of the mineral wool to the chromic and sulphuric acids, the result being a displacement of air from the shapeless mass of the mineral wool as gradually added and its replacement by fluid. The mineral wool being a good absorbent, a jellied mass is quickly formed; but mineral wool as used in my compound does not show so rapidly its full capacity for absorption, owing, probably, to the solid nature of the fabrics. It grows quite solid, however, as the electro-motive power of the cell decreases; but with the addition of an aqueous solution of acids the cell is put in good working condition a second time without removing the jellied mass. Crystallization then is absolutely overcome by the use of mineral wool, as the fluids are entirely absorbed in the wool, and there can be no sticky mass falling to the bottom of the cell. So, then, solutions for galvanic batteries containing bichromates of soda and potash can be better utilized in my improved method of making depolarizing compounds than in any other known manner. Therefore the constancy of any electric-battery cell containing these bichromates is greatly increased by the use of mineral wool.

The carbon electrodes can be sunk in the jellied compound as near the porous cup as desired, and, thus tightly held in place, will facilitate the flow of the currents between the poles of the battery and decrease the internal resistance of the cell.

My compounds are specially adapted for use in primary batteries in connection with incandescent-electric lighting and to run electric motors; but the current generated from these compounds, in connection with the zinc and carbon electrodes of primary batteries, can be successfully used in charging the plates of secondary batteries. Solutions of any desired power, however, can be made from the above-named ingredients, so that my new depolarizing compounds can be adapted to any kind of electric work in hand.

Having fully described my invention, what I desire to absolutely claim and secure by Letters Patent is—

1. In an electrical battery, mineral wool, in combination with acids or fluids of any kind capable of decomposing it.

2. The combination, in an electrical battery, of mineral wool with sulphuric acid, chromic acid, and water.

3. In an electrical battery, the combination of mineral wool and water, the latter securing the decomposition of the former, for use in the zinc-holding porous cup, as set forth.

4. In an electrical battery for any electrical service, a depolarizing jellied compound, by the use of which evaporation and crystallization are prevented, formed by the addition of mineral wool to acids in an aqueous solution, in which the porous cup, with its contents, and the electrodes, can be firmly placed and held in any desired position, substantially as set forth.

In witness whereof I have hereunto set my hand.

GEORGE B. PENNOCK.

Witnesses:
W. S. YARD,
WM. G. WINSLOW.